US008246856B2

(12) United States Patent
Leugers et al.

(10) Patent No.: US 8,246,856 B2
(45) Date of Patent: Aug. 21, 2012

(54) HIGHLY EFFICIENT PROCESS FOR MANUFACTURE OF EXFOLIATED GRAPHENE

(75) Inventors: Mary Anne Leugers, Midland, MI (US); Brian C. Nickless, Bay City, MI (US); Michael S. Paquette, Midland, MI (US); Robert C. Cieslinski, Midland, MI (US); Shu Tao Chen, Shanghai (CN)

(73) Assignee: Dow Global Technologies LLC, Midland, MI (US)

( * ) Notice: Subject to any disclaimer, the term of this patent is extended or adjusted under 35 U.S.C. 154(b) by 0 days.

(21) Appl. No.: 12/667,808

(22) PCT Filed: Jul. 28, 2008

(86) PCT No.: PCT/US2008/071326
§ 371 (c)(1),
(2), (4) Date: Jan. 5, 2010

(87) PCT Pub. No.: WO2009/018204
PCT Pub. Date: Feb. 5, 2009

(65) Prior Publication Data
US 2011/0014111 A1   Jan. 20, 2011

Related U.S. Application Data

(60) Provisional application No. 60/962,831, filed on Aug. 1, 2007.

(51) Int. Cl.
*C04B 14/00* (2006.01)
(52) U.S. Cl. .................. 252/378 R; 423/415.1; 423/448

(58) Field of Classification Search .............. 252/378 R; 423/448, 414, 415.1
See application file for complete search history.

(56) References Cited

U.S. PATENT DOCUMENTS

| 3,676,315 | A |   | 7/1972  | Goens et al. |
| 4,004,988 | A |   | 1/1977  | Mollard et al. |
| 4,146,401 | A | * | 3/1979  | Yamada et al. ............... 501/100 |
| 4,584,252 | A | * | 4/1986  | Touzain et al. ............... 429/209 |
| 4,773,975 | A |   | 9/1988  | Lipsztajn |
| 4,806,215 | A |   | 2/1989  | Twardowski |
| 6,306,264 | B1 | * | 10/2001 | Kwon et al. ............. 204/157.43 |
| 2007/0092432 | A1 |  | 4/2007  | Prud'Homme et al. |
| 2008/0039573 | A1 |  | 2/2008  | Cieslinski et al. |
| 2008/0171824 | A1 |  | 7/2008  | Cieslinski et al. |

FOREIGN PATENT DOCUMENTS

| WO | 2007047084 | 4/2007 |
| WO | 2008021033 | 2/2008 |
| WO | 2008079585 | 7/2008 |

OTHER PUBLICATIONS

Mallister, M.; Single Sheet Functionalized Graphene by Oxidation and Thermal Expansion of Graphite. Chem. Mater. 2007, 19. 4396-4404.*
Anodic Oxidation of Graphite in 10 to 98% HNO3 N. E. Sorokina, N. V. Maksimova, and V. V. Avdeev Moscow State University, Moscow, 119899 Russia Received Jun. 21, 2000.*

(Continued)

*Primary Examiner* — Stuart Hendrickson
*Assistant Examiner* — Richard M Rump

(57) ABSTRACT

A process for preparing oxidized graphite that provides exfoliated graphene, preferably with high surface area. The process uses considerably less chlorate than previously known systems.

11 Claims, 5 Drawing Sheets

OTHER PUBLICATIONS

In situ Raman monitoring of electrochemical graphite intercalation and lattice damage in mild aqueous acids Daniel C. Alsmeyer, Richard L. McCreery Analytical Chemistry 1992 64 (14), 1528-1533.*

Cerezo et al., "Structural, mechanical and dielectric properties of poly(ethylene-co-methyl acrylate-co-acrylic acid) graphite oxide nanocomposites", Composites Science and Technology, 2006, vol. 67, No. 1, pp. 79-91, Elsevier Ltd.

Mack et al., "Graphite Nanoplatelet Reinforcement of Electrospun Polyacrylonitrile Nanofibers", Advanced Materials, 2005, vol. 17, No. 1, pp. 77-80, Wiley-VCH Verlag GmbH & Co. KGaA.

Meyer et al., "The Structure of Suspended Graphene Sheets", Nature, 2007, vol. 446, pp. 60-63, Nature Publishing Group.

Niyogi et al., "Solution Properties of Graphite and Graphene", Journal of the American Chemical Society, 2006, vol. 128, No. 24, pp. 7720-7721, American Chemical Society.

Novoselov et al., "Two-dimensional atomic crystals", Proceedings of the National Academy of Sciences, 2005, vol. 102, pp. 10451-10453.

Novoselov et al., "Electric Field Effect in Atomically Thin Carbon Films", Science, 2004, vol. 306, pp. 666-669, www.sciencemag.org.

Staudenmaier, Ber. Dtsh. Chem. Ges. 1898, 31, 1484.

* cited by examiner

CHANGE IN BANDS OVER TIME
081506 - F First 4 Hours

CHANGE IN BANDS OVER TIME
081506 – F 48 Hours 10-10-06-1R First 6 Hours 10-10-06-1R 24 hours

HIGHLY EFFICIENT PROCESS FOR MANUFACTURE OF EXFOLIATED GRAPHENE

CROSS REFERENCE TO RELATED APPLICATIONS

This is a §371 application of PCT International Patent Application Number PCT/US2008/071326 filed Jul. 28, 2008, and claims priority from provisional application Ser. No. 60/962,831 filed Aug. 1, 2007, each of which is incorporated herein by reference in its entirety.

FIELD OF THE INVENTION

The present invention relates to processes for preparing oxidized graphite and exfoliated graphene, preferably highly exfoliated graphene (i.e., ultrahigh-surface area exfoliated graphite), the oxidized graphite and exfoliated graphene prepared thereby, and to composites containing the exfoliated graphene.

BACKGROUND OF THE INVENTION

Carbon nanotubes have extremely favorable properties and therefore have many actual and potential applications, including electrical shielding, conducting polymer composites, and hydrogen storage reservoirs. Carbon nanotubes, however, suffer from the high cost of synthesis. Alternate carbon materials offer the potential of similar properties at significantly lower expense.

One such alternative material is graphite. Graphite is an abundant natural mineral and one of the stiffest materials found in nature (Young's Modulus of approximately 1060 gigaPascals (gPa)) with excellent electrical and thermal conductivity. It has better mechanical, thermal and electrical properties and lower density compared to clays. The lower cost of crystalline graphite ($1.5 U.S. dollars per pound ($/lb) to $1.6/lb and less than $5/lb for graphite nanoplatelets) compared to other conductive fillers, such as carbon nanotubes (about $100 per gram ($/g)), vapor grown carbon fibers (VGCF, $40/lb to $50/lb) and carbon fibers (about $5/lb to $6/lb), as well as graphite's superior mechanical properties compared to those of carbon black, makes graphite an attractive alternative for commercial applications that require both physical-mechanical property improvement and electrical conductivity of the final product.

Graphite is made up of layered sheets of hexagonal arrays or networks of $sp^2$-carbon atoms. The sheets of hexagonally arranged carbon atoms are substantially flat and are oriented such that they are substantially parallel to each other.

Graphene is the aromatic sheet of $sp^2$-bonded carbon that is the two-dimensional (2-D) counterpart of naturally occurring three-dimensional (3-D) graphite (Niyogi et al., "Solution Properties of Graphite and Graphene, Journal of the American Chemical Society, 2006, 128, 7720). The interlayer spacing of the graphene sheets in graphite is 3.34 Å, representing the van der Waals distance for $sp^2$-bonded carbon (Niyogi et al.). Niyogi S., et al. also mention preparation of chemically-modified graphenes.

Novoselov K S, et al., "Electric Field Effect in Atomically Thin Carbon Films," Science, 2004; 306: 666; Meyer J., et al., "The structure of suspended graphene sheets," Nature, 2007; 446: 60-63; and Novoselov K S, et al., "Two-dimensional atomic crystals," Proceedings of the National Academy of Sciences, 2005; 102: 10451-10453 mention methods of producing graphene.

Mack et al., "Graphite Nanoplatelet Reinforcement of Electrospun Polyacrylonitrile Nanofibers," Advanced Materials, 2005; 17(1): 77-80, mention graphene has a Braunauer-Emmett-Teller (BET) theoretical surface area of about 2630 meter-squared per gram ($m^2/g$).

Exfoliated graphite generally is an exfoliated or partially delaminated graphite having a BET surface area greater than BET surface area of graphite but less than the BET theoretical surface area of a single graphene sheet (i.e., less than 2630 $m^2/g$).

Exfoliation or expansion of graphite is the process by which the distance between the graphene sheets in the graphite is increased, yielding a nanomaterial with an extremely large surface area. Such materials are useful for a variety of applications including, for example, in the formation of composites.

Conventional exfoliated graphene typically has a BET surface area of between about 25 $m^2/g$ to about 150 $m^2/g$, depending on average particle size. Conventional exfoliated graphene is generally prepared by oxidation/intercalation of graphite to produce an expanded oxidized graphite, followed by an exfoliation step, such as rapid heating at high temperature. Recent work by Prud'homme et. al (WO 2007/047084) has shown that the well-known Staudenmaier synthesis using mixed concentrated sulfuric and nitric acids (Staudenmaier, L., Ber. Dtsh. Chem. Ges., 1898, 31, 1484), when combined with a high potassium chlorate concentration, can provide a very strongly oxidizing slurry for the oxidation/intercalation of graphite from which a highly exfoliated graphene can be formed. For example, WO 2007/047084 describes a graphite oxide preparation in which the weight ratio of potassium chlorate to graphite is between 20:1 and 8:1 (wt/wt). The ratio actually used in the examples of WO 2007/047084 was 11:1. In the original Staudenmaier process, the weight ratio of potassium chlorate to graphite is reported as 2:1 (see Chemical Abstract Number 0:95311). However the original Staudenmaier preparation does not produce the high surface areas needed for excellent properties.

A highly exfoliated graphene is mentioned in PCT International Patent Application Publication Number (PIPAPN) WO 2008/079585, and in U.S. Patent Application Publication Numbers (USPAPN) US 2008-0171824 and US 2008-0039573.

U.S. Pat. Nos. 3,676,315; and 4,004,988 mention, among other things, electrolytic production of aqueous sodium chlorate with electrolytic cells comprising graphite anodes. U.S. Pat. No. 4,773,975 mentions, among other things, a cathode compartment containing graphite particles in contact with aqueous sodium chlorate. U.S. Pat. No. 4,806,215 mentions, among other things, a process for production of chlorine dioxide and sodium hydroxide employing a cathode compartment comprised of graphite and aqueous sodium chlorate reagent.

One considerable disadvantage of known oxidation processes that ultimately produce exfoliated graphene is the required use of large quantities of chlorate, a material that is both expensive and has the potential for forming hazardous or explosive reactions. Such disadvantages render the known processes commercially unfavorable. Thus, while it is known how to expand graphite by making oxidized graphite, it is desirable to produce such expanded graphite (i.e., oxidized graphite) in commercial quantities in a more efficient, economic, and safe manner.

BRIEF SUMMARY OF THE INVENTION

The present invention provides efficient and economic methods for producing expanded graphite oxide and exfoliated graphene, preferably highly exfoliated graphene. The present invention uses a strongly oxidizing mixture of sulfuric acid, nitric acid, and chlorate to oxidize graphite but, unlike previously known systems, uses considerably less chlorate to achieve substantially comparable materials.

In a first aspect, therefore, the present invention provides a process for manufacturing oxidized graphite. The process comprises: (a) mixing in a reaction vessel a reaction mixture comprising sulfuric acid, nitric acid, a first amount of a chlorate salt, and graphite as starting materials; (b) allowing the reaction mixture to react to form oxidized graphite; and (c) isolating the oxidized graphite from the reaction mixture, wherein the weight ratio of the chlorate salt to the graphite is from greater than 2:1 to less than 8:1. Preferably, the graphite consists essentially of particles having sizes characterized as being −10 mesh or a higher mesh number.

In a second aspect, the present invention provides a process for manufacturing oxidized graphite, the process comprising: (a) mixing in a reaction vessel a reaction mixture comprising concentrated sulfuric acid, concentrated nitric acid, a sodium chlorate, and a graphite as starting materials; (b) allowing the reaction mixture to react to form oxidized graphite, wherein when the sodium chlorate is solid sodium chlorate, temperature of the reaction mixture is 40 degrees Celsius (° C.) or higher; and (c) isolating the oxidized graphite from the reaction mixture. Preferably, the graphite consists essentially of particles having sizes characterized as being −10 mesh or a higher mesh number. Also preferably, when the sodium chlorate is solid sodium chlorate, the temperature of the reaction mixture comprising the solid sodium chlorate further is 100° C. or lower, more preferably 55° C. or lower.

In a third aspect, the present invention provides a process for manufacturing oxidized graphite, wherein the starting materials and various intermediates involved in the reaction are monitored in real time, preferably by Raman spectroscopy.

In a fourth aspect, the present invention provides a process for manufacturing exfoliated graphene. The process comprises: providing oxidized graphite prepared according to the process of the first aspect or second aspect of the present invention; and subjecting the oxidized graphite to an exfoliation step to produce highly exfoliated graphene. Preferably, the exfoliated graphene is a highly exfoliated graphene.

DETAILED DESCRIPTION OF THE INVENTION

Figure 1A:
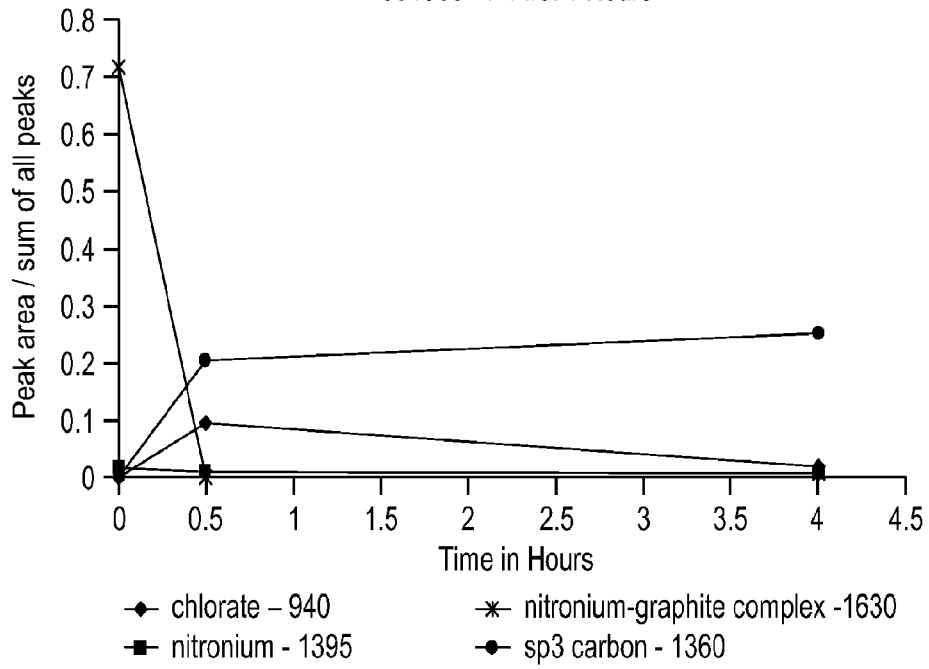
FIG. 1 is a graph showing the concentration of starting materials, intermediates, and product, as monitored by Raman spectroscopy, of an oxidation reaction of −325 mesh graphite at a graphite to chlorate ratio of 1:2.75.

As noted above, the present invention provides commercially viable processes for producing oxidized graphite, also known as expanded graphite oxide, and exfoliated graphene, preferably highly exfoliated graphene (i.e., ultrahigh-surface area exfoliated graphite). The processes of the first and second aspects of the present invention preferably exclude electrolysis (i.e., the graphites of the first and second aspects do not comprise an electrode (anode or cathode) of an electrolytic cell).

In any embodiment described herein, the open-ended terms "comprising," "comprises," and the like (which are synonymous with "including," "having," and "characterized by") may be replaced by the respective partially closed phrases "consisting essentially of," "consists essentially of," and the like or the respective closed phrases "consisting of," "consists of," and the like.

As used herein, the term "graphite" means finely divided solid particles consisting essentially of carbon. Preferably, graphite is in powder or flake form. Preferably, the graphite consists essentially of particles having sizes characterized as being −10 mesh or a higher mesh number (e.g., −100 mesh graphite). A −10 mesh graphite means graphite that can pass through a −10 mesh screen. More preferably, the graphite consists essentially of particles having sizes characterized as being about −100 mesh or a higher mesh number, still more preferably about −300 or a higher mesh number. Particle size and mesh number are inversely related.

The term "exfoliated graphene" means any carbon material derived by exfoliating a graphite oxide. The term "highly exfoliated graphene" means a carbon material derived by exfoliating a graphite oxide and having a BET surface area of from 400 $m^2/g$ to 1500 $m^2/g$. Preferably, the exfoliated graphene has a BET surface area of 500 $m^2/g$ or higher, more preferably more than 600 $m^2/g$, still more preferably 700 $m^2/g$ or higher, even more preferably 800 $m^2/g$ or higher. While higher BET surface areas are usually preferred, in some embodiments of the present invention, the exfoliated graphene has a BET surface area of 1400 $m^2/g$ or lower and, in other embodiments, 1200 $m^2/g$ or lower.

The terms "oxidized graphite" and exfoliated graphite oxide" are synonymous and mean a carbon material derived by oxidizing a graphite and comprising carbon atoms and oxygen atoms, wherein most, if not all, of the oxygen atoms are covalently bonded to some of the carbon atoms. Preferably, oxidized graphite consists essentially of the elements carbon and oxygen.

The oxidation of graphite to form expanded graphite oxide, according to the present invention, is carried out by mixing in a reaction vessel a reaction mixture containing graphite, sulfuric acid, nitric acid, and chlorate salt. Preferably, temperature is maintained below 55° C. The reaction can be represented by the following equation (equation 1), with potassium chlorate as the chlorate salt:

graphite+excess $H_2SO_4$+excess $HNO_3$+excess $KClO_3$→graphite oxide+KCl  (1)

The mixing of sulfuric acid and nitric acid is known to result in formation of nitronium ion ($NO_2^+$). What the inventors have discovered, however, is that the reaction of nitronium ion with a graphite particle results in formation of an intermediate graphite-nitronium complex that is a key precursor to the oxidized graphite. Further, the inventors have determined that if there is insufficient nitronium ion in the reaction, the chlorate salt cannot attack the graphite particle, but if the nitronium ion concentration is too high, the excess nitronium consumes the chlorate salts and prevents its use as an oxidant of the graphite. Thus, for example, if large particle graphite is used, only a small amount of nitronium ion is consumed to form the graphite-nitronium intermediate and the excess nitronium ion undesirably reacts with the chlorate to form a $NO_2ClO_3$ salt.

Through the above discoveries, the present invention permits the selection of the particular ratios of nitric acid, sulfuric acid, chlorate salt and graphite starting materials that provide graphite oxide product most efficiently, cost effectively, and with least danger of unsafe conditions.

Advantageously, the process of the present invention uses considerably less chlorate than previous systems said to yield graphite oxide and, ultimately, exfoliated graphene, and yet surprisingly provides graphite oxide and exfoliated graphene having properties at least as favorable as that produced by the previous processes.

In the first aspect of the present invention, and in some embodiments of the second aspect of the present invention, the weight ratio of chlorate salt to graphite is greater than 2:1 but less than 8:1. Preferably at least 3:1, more preferably at least 4:1, and is preferably 7:1 or less, and more preferably 6:1 or less. It is particularly preferred that the weight ratio of chlorate salt to graphite be at least 4:1 and no more than 6:1.

The sulfuric acid and nitric acid used in the oxidation reaction of the present invention are preferably both in concentrated form. Frequently, fuming sulfuric and fuming nitric are cited in the prior art as the acids used in the oxidation reaction. This mixture produces a very high concentration of nitronium ion and therefore an excess of nitronium ion results and this excess, as discussed above, can undesirably react directly with the chlorate salt. Thus, in the present invention, although fuming sulfuric and/or nitric acids may be used, particularly if they are controlled to limit the formation of nitronium ion, it is preferred that the acids be non-fuming acids, and instead be preferably concentrated acids.

Concentrated sulfuric acid is generally sold as a 95% to 98% solution. Concentrated nitric acid is generally sold as a 65% to 70% solution. Both acids are readily available from a variety of vendors, as are the chlorate salt and graphite. The concentration of sulfuric acid in the reaction mixture can vary, but is preferably at least about 50%, more preferably at least about 55%, and is no more than 70%, more preferably no more than about 65%, by weight based on the total weight of the reaction mixture. The concentration of nitric acid in the reaction mixture is preferably at least about 17%, more preferably at least about 23%, and is preferably no more than about 35%, more preferably no more than about 30%, by weight based on the total weight of the reaction mixture.

Graphite used in the present invention can be obtained from a variety of sources and used in various forms. Finer graphite starting material, when used according to the process described herein, yields expanded graphite oxide of higher surface area than obtainable with coarse graphite (e.g., −10 mesh graphite). This is illustrated in the Examples below. Preferably, therefore, the graphite used in the present invention is finely divided, with a preferred mesh size of at least about −100 mesh, more preferably at least about 200 mesh, and even more preferably at least about −300 mesh. Most preferred is about −325 mesh graphite (i.e., particles will be about 44 μm or smaller). Although fine graphite is preferable, coarse graphite may also be used, but it is preferable to adjust the concentration of the acids so that an excess of nitronium ion does not result in the consumption of chlorate salts.

The concentration of graphite in the reaction mixture is preferably at least about 2%, more preferably at least about 4%, and preferably no more than about 15%, more preferably no more than about 10%, even more preferably no more than about 8%, by weight based on the total weight of the reaction mixture.

The reaction is preferably run at 0 degrees Celsius (° C.), although other temperatures may be used. There is no particular limitation on how long the reaction should be run, but preferably, the reaction is quenched within 30 hours of reaction time, more preferably within 24 hours of reaction time, or within 6 hours of reaction time. In many cases, extensive oxidation has already taken place within the first 4 hours of the reaction. Surface areas of 400 $m^2/g$ to 500 $m^2/g$ can be obtained in roughly 4 hours of oxidation.

In a typical procedure according to the present invention, the sulfuric acid and nitric acid are preferably first mixed together before addition of the other reactants. The amounts of concentrated sulfuric acid and concentrated nitric acids are as discussed above, with a volume ratio of between about 255:100 and about 255:150, particularly 255:135, being especially preferred (sulfuric acid:nitric acid).

In the first aspect of the present invention, preferably, the chlorate salt is potassium chlorate, calcium chlorate, or sodium chlorate, more preferably potassium chlorate (solid powder) or sodium chlorate (solid powder), still more preferably potassium chlorate (solid powder) or aqueous sodium chlorate.

In the second aspect of the present invention, the sodium chlorate preferably is solid sodium chlorate or, more preferably, aqueous sodium chlorate. Preferably, the aqueous sodium chlorate has a sodium chlorate concentration of at least 0.1 molar (M; i.e., 0.1 moles of sodium chlorate per liter of aqueous sodium chlorate) up to a saturated solution, i.e., the concentration at saturation of sodium chlorate in water. In other embodiments, the sodium chlorate concentration is 8 molar or less. In some embodiments, the saturated aqueous sodium chlorate is a solution. In other embodiments, the saturated aqueous sodium chlorate further contains solid sodium chlorate.

In other embodiments of the second aspect of the present invention, temperature of the reaction mixture is maintained between 0° C. and 55° C.

Solubility of sodium chlorate in water at 20° C. is 209 grams (g) sodium chlorate per 100 milliliters (mL) water. Weight percent is calculated by dividing weight of chlorate salt by (sum of weight of chlorate salt+weight of water). Thus at 20° C. and density of water of 1.00 g/mL, a saturated aqueous sodium chlorate solution will be 209 g/309 g or 68 weight percent.

Also in the second aspect of the present invention, preferably the weight ratio of sodium chlorate to graphite is from 20:1 to 1:10.

Following mixing of the sulfuric acid and nitric acid, sufficient time is allowed for the formation of the nitronium ion, for instance 2 hours to 4 hours. Then, the graphite is added to the acid mixture, preferably with stirring until the graphite is essentially uniformly distributed in the acid mixture. This allows the formation of the graphite-nitronium intermediate. A chlorate salt is then added, either in portions or all at once, with addition in portions being preferred. Preferably, the chlorate salts are added slowly so that $ClO_2$ gas evolution can be controlled and the cost of excess chlorate salt can be avoided. Following addition of the chlorate, the reaction mixture is allowed to stir until the desired amount of graphite oxide is formed, preferably between about 4 hours and 50 hours, more preferably up to about 30 hours, more preferably up to about 24 hours.

The reaction may be quenched, for example, by adding the reaction mixture to an excess of deionized water, with stirring. The graphite oxide product may then be isolated by, for example, filtration, centrifugation, or decantation, with filtration being preferred. The filtered product may be washed with additional deionized water, and then dried, for example, at between about 60° C. and 80° C. overnight.

Formation of exfoliated graphene from the graphite oxide can be carried out by a variety of processes, including solution processes, sonication, or thermal processes. Preferred is thermal exfoliation at a temperature of from about 250° C. to about 2000° C., more preferably at a temperature of from about 500° C. to about 1500° C., still more preferably at a temperature of about 1000° C. Thermal exfoliation is preferably done under a substantially inert atmosphere, e.g., under an atmosphere consisting essentially of nitrogen, helium, argon, or a mixture thereof. In a typical procedure, the graphite oxide prepared as described above is placed in a quartz boat or other suitable high temperature container and placed into a heated furnace under inert atmosphere, such as nitrogen, at high temperature for a short time, such as at about 1000° C. for 30 seconds. The container and product are then withdrawn from the furnace and cooled. Prior to use, the fluffy black exfoliated graphene may be homogenized in a blender or other homogenizer.

Another aspect of the present invention concerns the real time monitoring, in the graphite oxide formation process, of starting materials, intermediates, and product. Such monitoring is particularly favorable in large scale commercial processes, where real time adjustments to the reaction, such as adjusting the quantities of starting materials and/or reaction conditions, may be made to maximize formation of desirable product and reduce the potential for hazardous or explosive conditions. In addition, the monitoring allows the control of the concentration of the nitronium ion which, as discussed above, forms an intermediate with the graphite particle. As noted, excess formation of nitronium ion is preferably limited, in order to avoid consumption of expensive chlorate salts.

Raman spectroscopy is a particularly well suited technique for the real time monitoring of the graphite oxide manufacture process. Using Raman spectroscopy, it is possible to monitor the starting materials, including the chlorate and the nitronium ion formed by the sulfuric acid/nitric acid, as well as the observed nitronium-graphite intermediate complex. The formation of oxidized graphite product can also be monitored by Raman spectroscopy. Thus, the concentrated nitric acid and concentrated sulfuric acid may be added in the ratios needed to provide optimal concentration of graphite-nitronium complex by monitoring reactions in real time with Raman spectroscopy and adjusting relative amounts of the concentrated nitric acid and concentrated sulfuric acid if needed.

According to this aspect, therefore, the present invention provides a process for making graphite oxide in which chlorate, nitronium ion, nitronium-graphite complex, and/or graphite oxide are monitored, preferably in real time and preferably by Raman spectroscopy.

Nitronium ion, formed by the mixing of sulfuric acid and nitric acid, can be observed in Raman spectroscopy as a band at about 1396 reciprocal centimeters ($cm^{-1}$). Without wishing to be bound by any particular theory, it is believed that upon addition of the graphite to the reaction mixture formed in a process of the present invention, the nitronium ion reacts with the graphite particles to form the graphite-nitronium complex. The graphite-nitronium complex is observed in Raman as a band at about 1629 $cm^{-1}$. Potassium chlorate can be observed as a band at about 940 $cm^{-1}$. Carbons with $sp^3$ hybridization, representing the oxidized graphite, are observed as a band at about 1360 $cm^{-1}$.

In preferred embodiments of the present invention, the amounts of the starting materials are selected such that the concentration of excess nitronium ion in the reaction mixture is minimized throughout the reaction. Thus in some embodiments of the first aspect of the present invention, the first amount of the chlorate salt is added at a monitored rate so as to minimize the concentration of excess nitronium ion in the reaction as measured by Raman spectroscopy. The concentration of nitronium is minimized through the monitoring of the reaction and the use of appropriate amounts of starting materials as described above. By minimizing the concentration of excess nitronium, it has been found that oxidized graphite of higher surface area can be obtained. Preferably, the first amount of the chlorate salt is selected such that no nitronium-graphite complex is detectable in the reaction mixture by Raman spectroscopy after addition of the first amount of the chlorate salt is complete. When nitronium-graphite complex is detectable in the reaction mixture by Raman spectroscopy after addition of the first amount of the chlorate salt is complete, then one or more second amounts of chlorate salt is added until nitronium-graphite complex is no longer observed by Raman spectroscopy, wherein each second amount may be the same or different. Preferably, each second amount of the chlorate salt is less than the first amount of the chlorate salt.

The following examples are illustrative of the present invention but are not intended to limit its scope.

EXAMPLES

General

Instrumentation. Raman spectra are collected using visible excitation at 532 nanometers (nm) and the spectrometer interfaced to a fiber optic probe. The tip of the probe is mounted on a portable probe stand and placed immediately outside a tube containing the reactants. The probe is configured for 180 degree backscatter collection. The Raman spectrometer system is configured as follows:

Coherent 532 nm diode-pumped Nd/YAG laser—with doubling crystal;

Kaiser Holospec grating spectrograph;

532 nm Holoplex grating, filters, probe head;

4.5 mm focal length objective, Mark II probe, multimode fibers: 50 micrometer (μm) core excitation, 100 μm core collection.

It should be noted that while the above instrument configuration is used in the examples, there are many configurations which can be used for this purpose and which provide analogous results.

Oxidation Reaction. An oxidation reaction can be carried out as follows. The concentrated sulfuric acid and the concentrated nitric acid are mixed with one another at a 255:135 volume ratio, respectively. The potassium chlorate is sieved through a 500 μm screen to eliminate any large chunks. Initially measure out the predetermined amount of the pre-mixed concentrated sulfuric/concentrated nitric acid solution (255:135), the graphite, and the appropriate amount of sieved potassium chlorate. Add the amount of the pre-mixed acid to the graduate. Start the magnetic stirrer at a low but observable rpm. Add the graphite to the graduated cylinder. Allow the mixed acid and graphite to stir for about 10 minutes to ensure the graphite is uniformly distributed in the acid solution.

The reaction is conducted in a fume hood and the potassium chlorate addition is done behind an additional Plexiglas shield. The initial temperature of the acid/graphite mixture is noted. There may be some effervescence in the mixture as chlorine dioxide gas (a yellow gas) evolves. Add the potassium chlorate slowly in small increments in order to keep the foaming slurry well below the half height of the graduate. When the addition is complete, cover with a light plastic weigh boat and let the reaction stir for 4 to 48 hours.

Quenching of the Reaction. Measure out 200 mL of deionized water into a 600 mL beaker. Stop the stirring and remove the lid. Dump the contents of the tube into the quench water and thoroughly rinse the tube using a deionized water squirt bottle. Bring the total quench volume up to 400 mL and allow it to stir for 10 minutes. Filter the 400 mL of solution using a 4" funnel and #1 Whatman filter paper. Rinse the filter cake with an additional 50 mL of deionized water. After the rinse water has all been pulled thru the filter remove the wet filter cake from the filter paper by scraping the paper clean with a spatula and allow the filter cake to dry overnight between 60° C. to 80° C.

Exfoliation of Graphite Oxide—Formation of Exfoliated Graphene. Exfoliated graphene is prepared from the graphite oxide by placing the graphite oxide in a quartz boat and sliding the boat into a heated tube furnace under nitrogen at 1000° C. for 30 seconds, then withdrawing and cooling the boat. The fluffy black exfoliated graphene is then treated briefly in a blender to homogenize the material.

Raman Band Assignments. Raman bands and their assignments are provided in Table 1.

TABLE 1

Assignments of vibrational bands

| Band (cm$^{-1}$) | Assignment | Band (cm$^{-1}$) | Assignment |
|---|---|---|---|
| 435 | con sulfuric acid | 1180 | con sulfuric acid |
| 495 | con nitric acid | 1309 | con nitric acid |
| 575 | con sulfuric acid | 1360 | sp$^3$ carbon |
| 650 | con nitric acid | 1395 | nitronium |
| 687 | con nitric acid | 1550 | con nitric acid |
| 910 | con sulfuric acid | 1555-1625 | sp$^2$ carbon |
| 940 | chlorate | 1630 | nitronium-graphite complex |
| 1040 | Reference (both acids) | 1670 | con nitric acid |

Comparative Example 1

Oxidation of Fine Graphite at Graphite to Chlorate Ratio of 1 to 11

This example demonstrates the oxidation reaction at a chlorate salt to graphite weight ratio of 11 to 1 (i.e., 11:1). Fine graphite (−325 mesh) is used. Details of the reaction and product are provided in Table 2.

TABLE 2

Experiment Description

| Details | Reaction Time | Sample No. | BET Surface area (m$^2$/g) |
|---|---|---|---|
| 0.25 g Fine graphite (−325 mesh) 6.5 mL fresh mixed acid | Baseline (acid + graphite) | rxa0178 | Not Measured (NM) |

TABLE 2-continued

Experiment Description

| Details | Reaction Time | Sample No. | BET Surface area (m$^2$/g) |
|---|---|---|---|
| Bulk addition of 2.75 g KClO$_3$ Covered with weigh boat Ice Bath | 30 minutes | rxa0180 | NM |
| | 1 hour | rxa0182 | NM |
| | 2 hour | rxa0184 | NM |
| | 4 hour | rxa0186 | NM |
| | 6 hour | rxa0188 | NM |
| | 24 hour | rxa0190 | 976 |

Figure 2A:
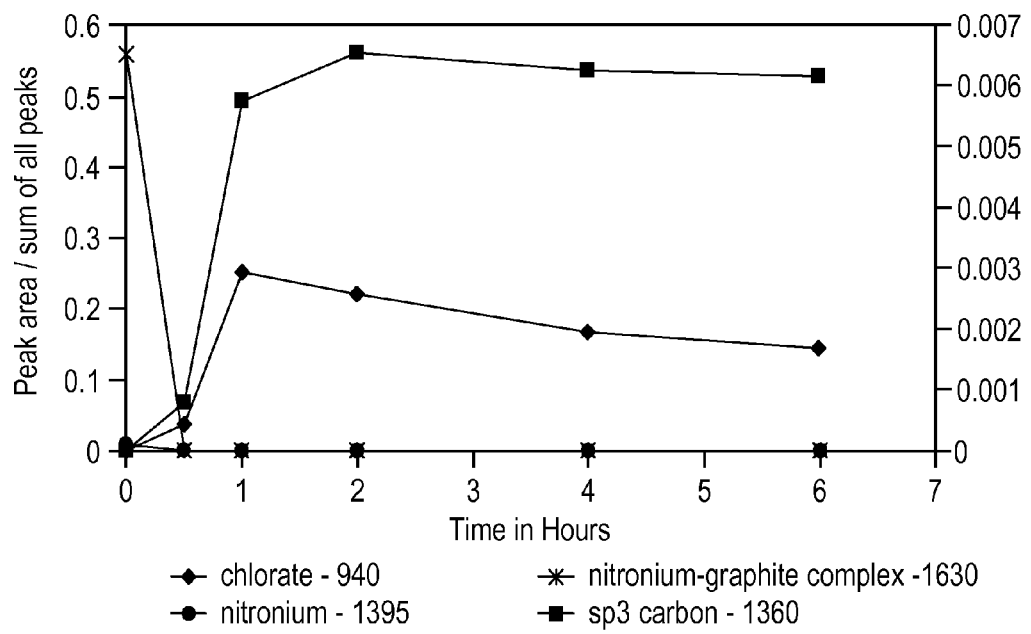
FIG. 2 is a graph showing the concentration of starting materials, intermediates, and product, as monitored by Raman spectroscopy, of an oxidation reaction of −325 mesh graphite at a graphite to chlorate ratio of 1:11.
Figure 2B:
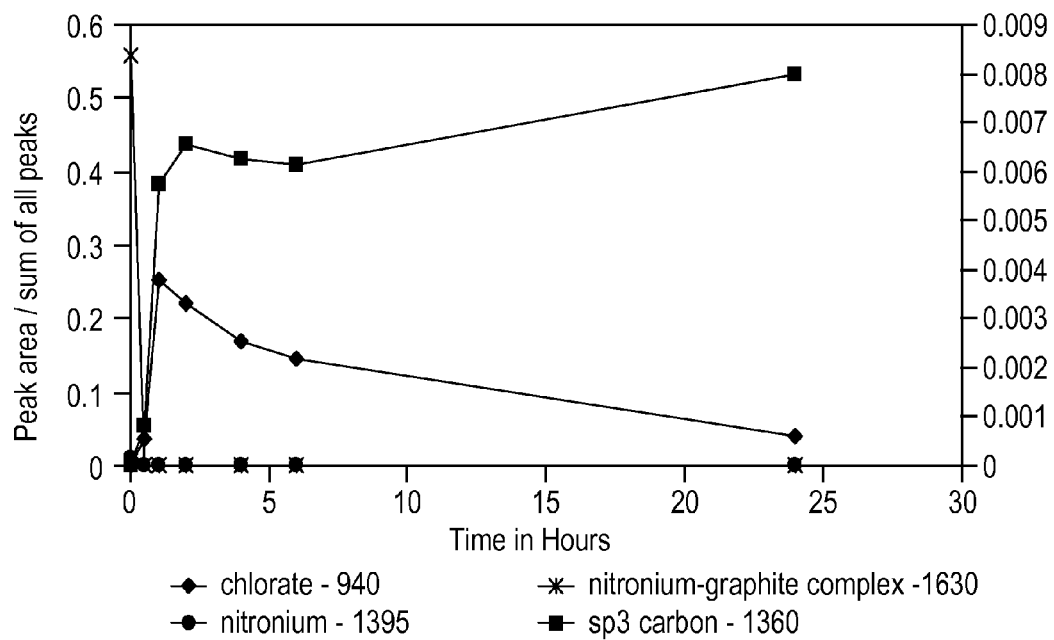

Use of a high concentration of chlorate yields product with high surface area. Raman analysis demonstrates that upon addition of the KClO$_3$, the nitronium ion concentration immediately decreases to zero, and the sp$^3$ carbon band at 1360 cm$^{-1}$ appears for the first time, indicating the oxidation of the graphite (see FIG. 2A, showing reaction progress over the first 6 hours). FIG. 2B shows that the sp$^3$ carbon continues to increase throughout the reaction. The nitronium-graphite complex (1630 cm$^{-1}$) does not reform, potentially indicating that the lack of nitronium ions can keep the nitronium—graphite complex from reforming.

Example 1

Oxidation of Fine Graphite at Graphite to Chlorate Ratio of 1 to 2.75

This example demonstrates the oxidation reaction at a chlorate salt to graphite weight ratio of 2.75 to 1. Fine graphite (−325 mesh) is used. Details of the reaction and product are provided in Table 3.

TABLE 3

Experiment description

| Details | Reaction Time | Sample No. | BET Surface area (m$^2$/g) |
|---|---|---|---|
| 0.9 g Fine graphite (−325 mesh); Done in a 50 mL beaker; 30 mL mixed acid; Bulk addition of 2.475 g KClO$_3$; Covered with weigh boat | Baseline (acid + graphite) | rxa0054 | NM |
| | 30 minutes | rxa0057 | NM |
| | 4 hour | rxa0058 | 20 |
| | 24 hour | rxa0061 | 19 |
| | 48 hour | rxa0063 | 22 |

Figure 1B:
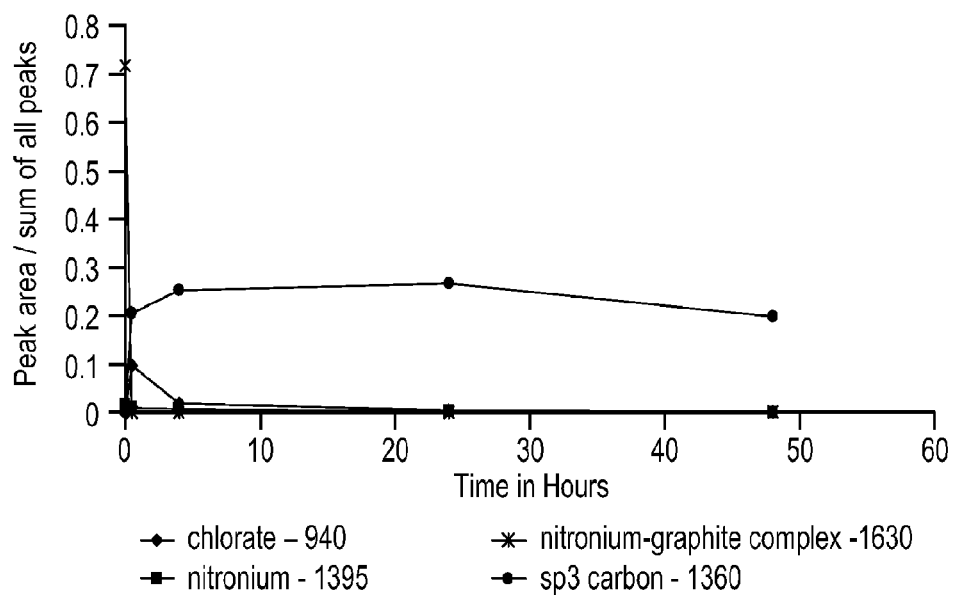

Use of low concentration of KClO$_3$ results in a fairly low surface area product, measured to be 22 m$^2$/g. Raman spectroscopic analysis of the reaction reveals that upon addition of the KClO$_3$, the nitronium ion concentration immediately decreases and the sp$^3$ carbon band at 1360 cm$^{-1}$ appears for the first time, indicating the oxidation of the graphite (see FIG. 1A, showing reaction progress over the first 4 hours). FIG. 1B shows that sp$^3$ carbon continues to increase throughout 24 hours. The nitronium ions are present through 24 hours, during which it is slowly decreasing to zero. After 30 minutes, the nitronium-graphite complex is undetected.

Example 2

Oxidation of Coarse Graphite at a Graphite to Chlorate Ratio of 1 to 2.75

This example demonstrates the oxidation reaction at a chlorate salt to graphite weight ratio of 2.75 to 1. Coarse graphite (−10 mesh) is used. Details of the reaction and product are provided in Table 4.

TABLE 4

Experiment description

| Details | Reaction Time | Sample No. | BET Surface area (m²/g) |
|---|---|---|---|
| 0.9 g Coarse graphite | Baseline (acid + graphite) | Rxa0064 | NM |
| Done in a 100 mL graduated cylinder | | | |
| 30 mL mixed acid | 30 minutes | Rxa0066 | NM |
| Bulk addition of 2.475 g | 4 hour | Rxa0068 | 70 |
| KClO$_3$ | 24 hour | Rxa0070 | 63 |
| Covered with weigh boat | 48 hour | Rxa0072 | 60 |

Figure 3A:
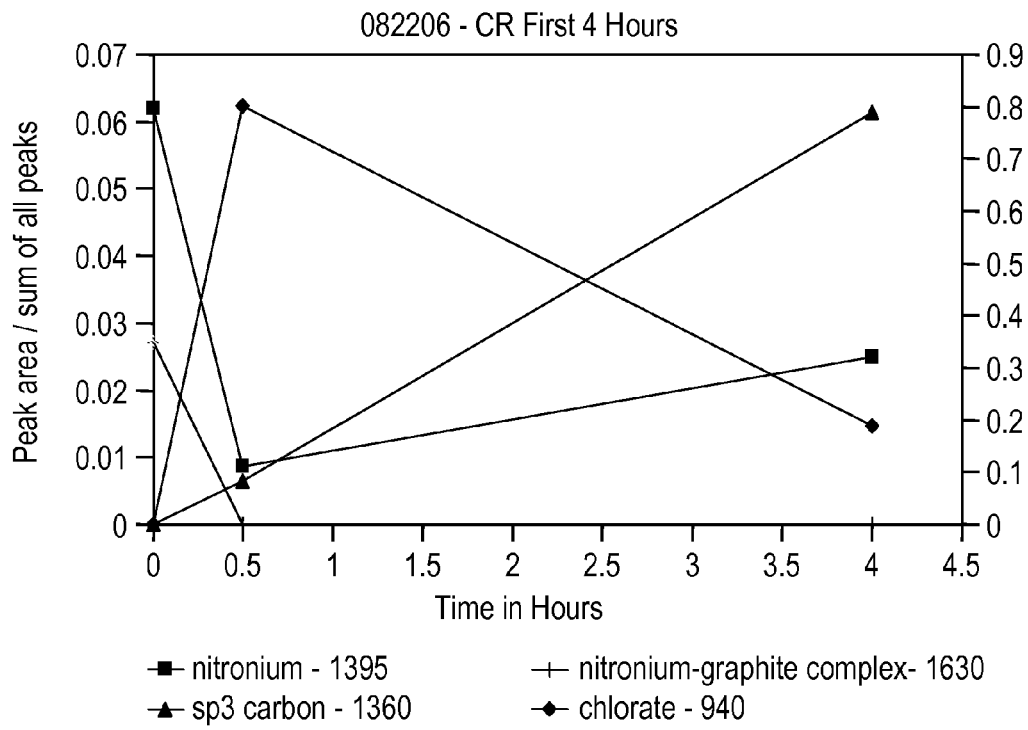
FIG. 3 is a graph showing the concentration of starting materials, intermediates, and product, as monitored by Raman spectroscopy, of an oxidation reaction of −10 mesh graphite at a graphite to chlorate ratio of 1:2.75.
Figure 3B:
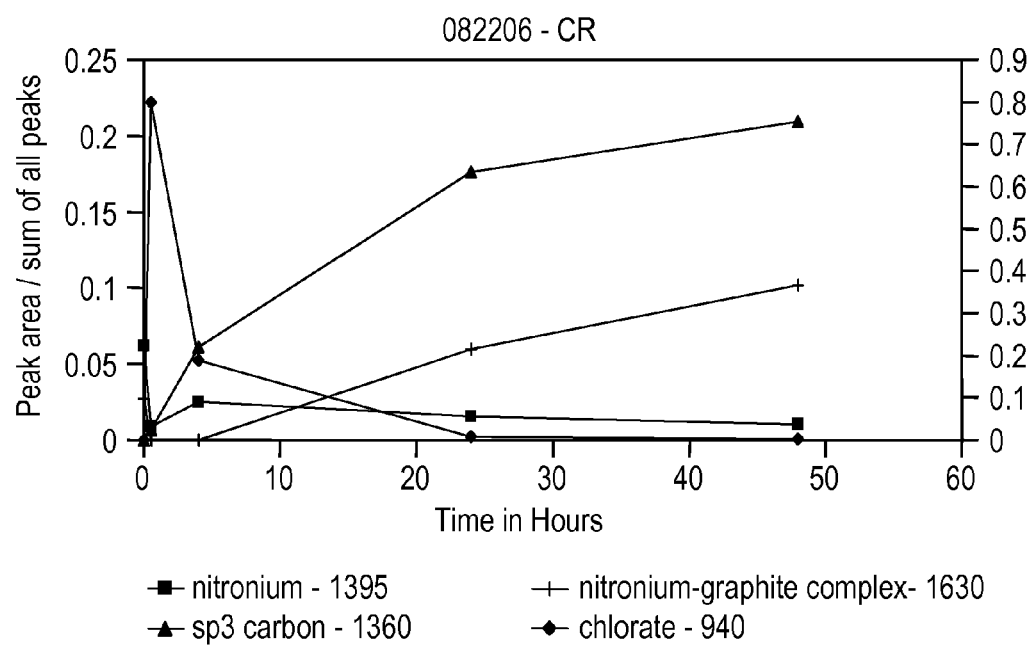

Use of lower concentration of KClO$_3$ with coarse graphite result in a fairly low surface area product, measured to be 60 m²/g. Raman analysis reveals that that upon addition of the KClO$_3$, the nitronium ion concentration immediately decreases and the sp$^3$ carbon band at 1360 cm$^{-1}$ appears for the first time, indicating the oxidation of the graphite (see FIG. 3A). FIG. 3B shows that sp$^3$ carbon continues to increase throughout the reaction. However, nitronium ions are present during the entire course of the reaction and decreases slowly over the 48 hour period. After 4 hours, the nitronium-graphite complex continues to increase in intensity, potentially indicating that the excess nitronium ion can still continue to react with new regions of the graphite particle.

Example 3

Oxidation of Coarse Graphite at a Graphite to Chlorate Ratio of 1 to 8.25

This example demonstrates the oxidation reaction at a chlorate salt to graphite weight ratio of 8.25 to 1. Coarse graphite (−10 mesh) is used. Details of the reaction and product are provided in Table 5.

TABLE 5

Experiment Description

| Details | Reaction Time | Sample No. | BET Surface Area (m²/g) |
|---|---|---|---|
| 0.9 g Coarse graphite | Baseline (acid + graphite) | rxa0065 | NM |
| Done in a 100 mL graduated cylinder | | | |
| 30 mL mixed acid | 30 minutes | rxa0067 | NM |
| Bulk addition of 7.425 g KClO$_3$ | 4 hour | rxa0069 | 120 |
| Covered with weigh boat | 24 hour | rxa0071 | 175 |
| | 48 hour | rxa0073 | 180 |

Figure 4A:
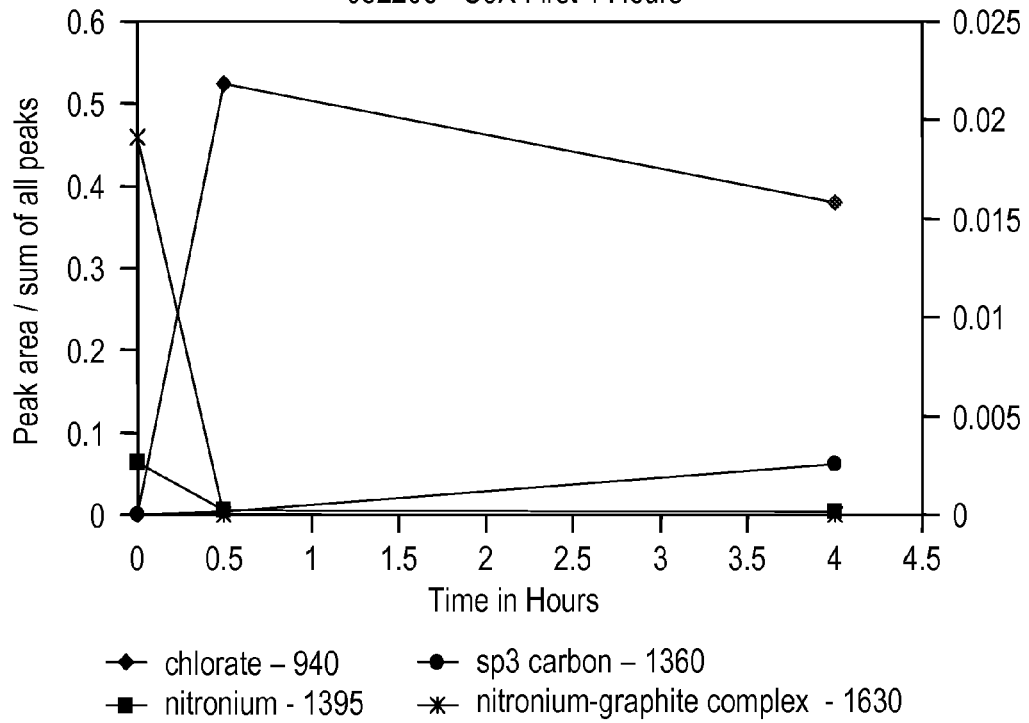
FIG. 4 is a graph showing the concentration of starting materials, intermediates, and product, as monitored by Raman spectroscopy, of an oxidation reaction of −10 mesh graphite at a graphite to chlorate ratio of 1:8.25.
Figure 4B:
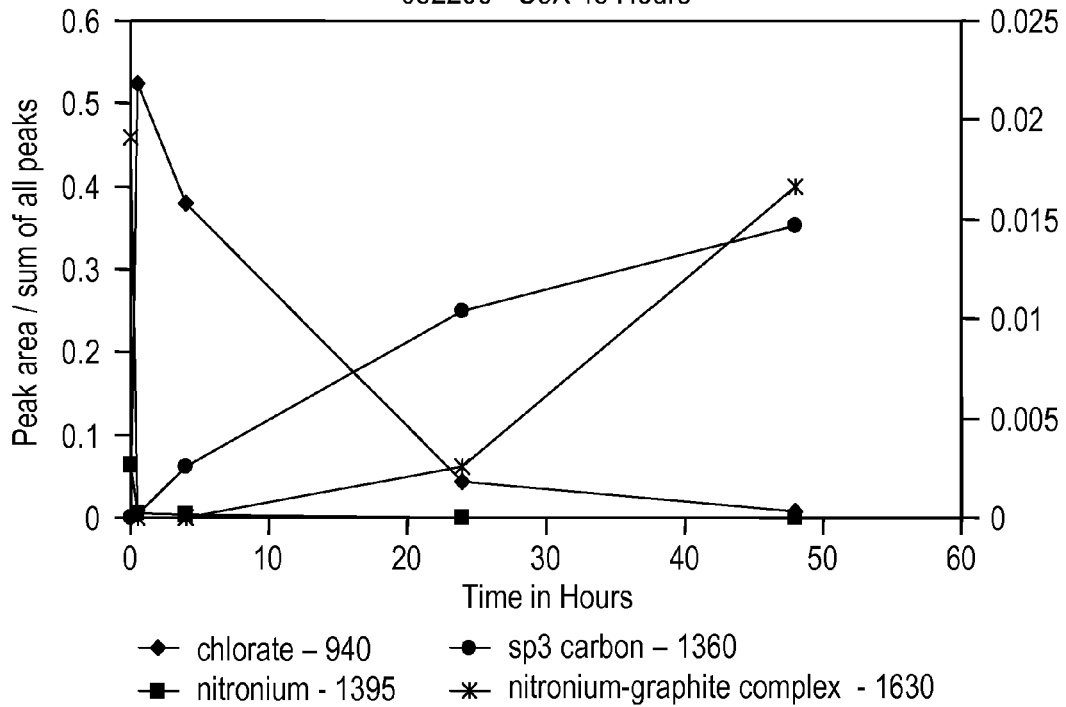

Use of a higher concentration of KClO$_3$ results in a surface area of about 180 m²/g. This is a reasonably high surface area for coarse graphite. Raman analysis illustrates that upon addition of the KClO$_3$, the nitronium ion concentration immediately decreases and the sp$^3$ carbon band at 1360 cm$^{-1}$ appears for the first time, indicating the oxidation of the graphite (see FIG. 4A). FIG. 4B shows that sp$^3$ carbon continues to increase throughout the reaction, and the nitronium ions go to zero in the 48 hour period. After 4 hours, the nitronium-graphite complex continues to increase in intensity, potentially indicating that the excess nitronium ions can still continue to react with new regions of the graphite particle.

Example 4

Oxidation of Fine Graphite at a Graphite to Chlorate Ratio of 1 to 5.5

This example demonstrates the oxidation reaction at a chlorate salt to graphite weight ratio of 5.5 to 1. In this example, 10 g of −325 mesh graphite flake is reacted with 55 g KClO$_3$ in 260 mL of mixed sulfuric/nitric acid at a volumetric ratio of 255:135. The reaction was allowed to stir for 23 hours then was quenched and filtered. Exfoliation is conducted as described in the general section above. The surface area of the resulting highly exfoliated graphene product is 855 m²/g.

Table 6 below, summarizing the results of the preceding Comparative Example and Examples, reveals the highly exfoliated graphene prepared according to the process of the present invention exhibits BET surface areas comparable to highly exfoliated graphene prepared with twice the amount of chlorate. In addition, the results show that in some invention embodiments, starting with a finer graphite material (e.g., −325 mesh) is preferred over starting with coarser graphite material (e.g., −10 mesh) for yielding highly exfoliated graphene. Nevertheless, highly exfoliated graphene may be prepared from coarser graphite material using the invention process by applying more rigorous process conditions such as, for example, heating intermediate graphite oxide at higher temperatures.

TABLE 6

Summary of results from Comparative Example 1 and Examples 1 to 4 is provided in

| Example Number | Starting Graphite Size | Graphite:Chlorate Wt. Ratio | BET Surface Area (m²/g) of Product |
|---|---|---|---|
| Comparative Example 1 | −325 mesh | 1:11 | 976 |
| 1 | −325 mesh | 1:2.39 | 22 |
| 2 | −10 mesh | 1:2.39 | 60 |
| 3 | −10 mesh | 1:8.25 | 180 |
| 4 | −325 mesh | 1:5.5 | 855 |

Example 5

Formation of Highly Exfoliated Graphene-Polymer Composites

This example compares the use of highly exfoliated graphene prepared according to the reduced chlorate process of the present invention (e.g., Example 4) versus highly exfoliated graphene prepared using high chlorate concentration (Comparative Example 1), in the formation of highly exfoliated graphene-polymer composites. As shown above in Table 6, both highly exfoliated graphenes have similarly high surface area.

The highly exfoliated graphene-polymer composites are prepared as follows. A two gram composite sample containing highly exfoliated graphene that has been sonicated into platelets (a form of the highly exfoliated graphene comprising a mixture of particles, each particle comprising one or more sheets of graphene and largely lacking expanded worm-like structures (such as those mentioned by Prud'homme et. al.; WO 2007/047084) and ethylene vinyl acetate copolymer, EVA (ELVAX™ 4987W, E.I. DuPont de Nemours and Company) is prepared containing a concentration range of between 2.5 weight percent (wt %) and 10 wt % of the highly exfoliated graphene platelets. The highly exfoliated graphene platelets are prepared prior to the addition of the EVA by pretreating by sonicating typically 0.1 gram of highly exfoliated graphene, e.g., of Example 4 or Comparative Example 1, for 20 hours in 100 mL of toluene solvent in a sonic bath to break up any expanded worm-like structures. The highly exfoliated graphene platelet solution is then added to an 1.9 gram EVA solution in the same solvent (i.e., toluene), at a temperature above 95° C. (melting point of the EVA copolymer), but less than 110° C. (boiling point of toluene) to form a 5 wt % highly exfoliated graphene platelet-polymer solution in toluene. The mixed solution is then allowed to cool and is vacuum rotary evaporated at 85° C. to remove solvent (toluene). The remaining rubbery powder is then further dried overnight in a vacuum oven at 75° C. to remove any remaining residual solvent.

Example 6

Testing Highly Exfoliated Graphene Platelet-Polymer Composites

After separately blending approximately 2 grams each of the graphene platelet-polymer composites of Example 5, each of the resulting blends then are separately melt pressed into disks using a Leco mounting press at 5000 pounds per square inch, absolute (psia) (i.e., 340 atmospheres) and 160° C. Each disk is cut into strips in which the volume resistivity and morphology is examined. The morphology is examined in JEOL 1230 transmission electron microscope. For the TEM, specimens of each disk are prepared at −100° C. using a cryoultramicrotome. Thin sections are obtained and then examined in the TEM and representative images are captured using a Gatan, Inc. (Pleasanton, Calif., USA) CCD digital camera.

Figure 5:
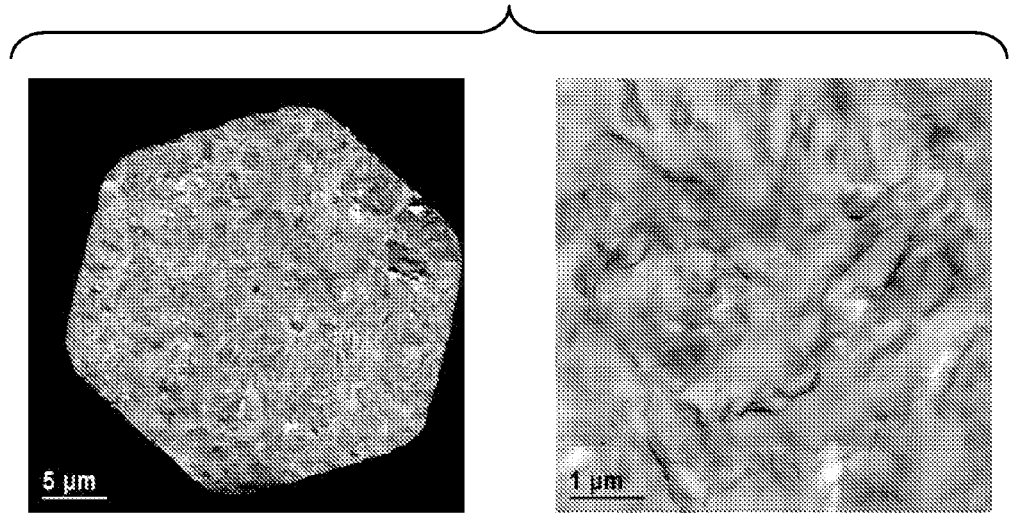
FIG. 5 is a transmission electron microscope (TEM) micrograph of a polymer composite containing highly exfoliated graphene ultimately prepared from −325 mesh graphite at a graphite to chlorate ratio of 1:11.
Figure 6:
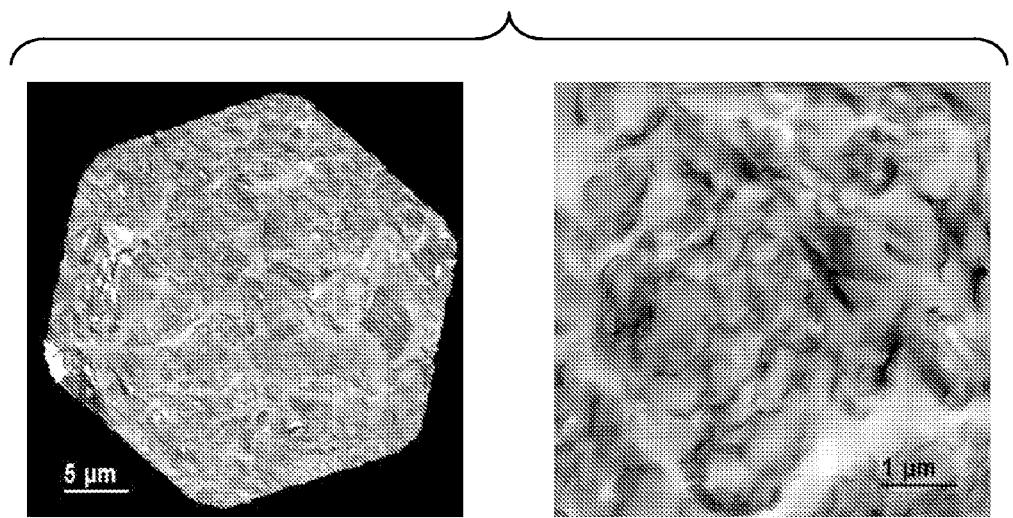
FIG. 6 is a TEM micrograph of a polymer composite containing highly exfoliated graphene ultimately prepared from −325 mesh graphite at a graphite to chlorate ratio of 1:5.5.

Comparing samples of the graphene platelet-polymer composite of Example 5 (made from the highly exfoliated graphene prepared according to the process of the present invention (e.g., Example 4)) to samples of the highly exfoliated graphene platelet-polymer composite prepared from highly exfoliated graphene made according to a process employing high chlorate concentration (e.g., Comparative Example 1) reveals no significant differences. In particular, the highly exfoliated graphene platelet-polymer composites exhibit similar resistivities (11,414 ohm-centimeters (ohm-cm) for the Comparative Example 1 material and 1014 ohm-cm for the Example 4 material). Morphologies, as observed by thin-section TEM, are also similar (see FIG. 5 for the Comparative Example 1 sample and FIG. 6 for the Example 4 sample). This example, therefore, demonstrates that the reduced chlorate process of the present invention provides highly exfoliated graphene products with similar performance to highly exfoliated graphenes produced by a high chlorate process.

Example 7

Formation of Highly Exfoliated Graphene-Polymer Composites

Highly exfoliated graphene powder (e.g., of Example 4), without sonicating pretreatment, is added directly to an EVA polymer melt to form the highly exfoliated graphene-polymer composite. Typically 2.5 grams of the highly exfoliated graphene is added to 47.5 grams of melted EVA in a Braybury or Haake mixer to make 50 grams of 5 wt % highly exfoliated graphene composite.

Example 8

One-Gram-Scale Preparation of Graphite Oxide from Graphite and Aqueous Sodium Chlorate This procedure should be performed in a fume hood with good ventilation. The efficiency of the hood should be checked before each reaction and filtration. This reaction utilizes a powerful oxidizer ($NaClO_3$) and concentrated mineral acids. A toxic and explosive intermediate ($ClO_2$) is generated during the reaction.

Amounts of materials per reaction: 1 g graphite powder or flake; 11 g (maximum) $NaClO_3$; and 26 mL (maximum) of fresh mixed acids (255 mL/135 mL ratio of $H_2SO_4$ to $HNO_3$).

Preferably, the reaction is performed in a heavy walled glass kettle, covered by loose-fitting Teflon lids and mixed with magnetic stirrer at 0° C. to 5° C., while situated on a magnetic sir plate. Four 160 mL glass culture tubes are placed inside the kettle and contain the reaction contents. Concentrated sulfuric acid and concentrated Nitric acid are mixed with one another at a 255:135 volume ratio respectively prior to the reaction. Equal portions of the sulfuric acid are added carefully to the empty reaction tubes and then equal portions (to each other) of the nitric acid are added to the sulfuric acid in the tubes. This mixture will warm up to about 50° C. to 60° C. Begin stirring the resulting acid mixture. Allow resulting acid mixture to cool. Then insert the thermocouple to monitor temperature. Add 1.0 g of −325 mesh graphite to the tube by adding it through the glass funnel. Check the temperature of the mixture. Weigh amount of sodium chlorate into a beaker and add appropriate amount of water to give 50 weight percent sodium chlorate solutions. It must be added slowly to control the oxidation reaction. Add the aqueous sodium chlorate to the tubes slowly over 20 minutes while controlling temperature by adjusting the addition rate of the aqueous sodium chlorate to control the temperature at the desired level. (The water in the aqueous sodium chlorate reacts with the acid to release heat) The reaction is allowed to continue for 4 hours to 96 hours (usually 24 hours). The reaction contents are quenched by adding them to separate beakers containing 250 mL each of deionized water. The quenched mixtures (about 400 mL) are then filtered (or centrifuged), and the crude products are washed with 50 mL each of deionized water to give brown filter cake. Dry in a laboratory oven (60° C. to 80° C.) until a constant weight is obtained. Exfoliation is conducted as described in the general section above to give highly exfoliated graphene. Repeat for a total of 14 reactions. Results of the 14 reactions, numbered 1 to 14, are shown below in Table 7. In Table 7, "Vol." means volume and "Amt." means amount.

TABLE 7

One-Gram-Scale Preparation of Graphite Oxide
from Graphite and Aqueous Sodium Chlorate

| Example 8 Reaction Numbers | Weight NaClO₃ (g) | Weight Ratio NaClO₃ to Graphite | Vol. H₂SO₄ (mL) | Vol. HNO₃ (mL) | Vol. H2O (mL) | Amt. H₂SO₄ (mol) | Amt. HNO₃ (mol) | Amt. H₂O (mol) | BET Surface Area (m²/g) |
|---|---|---|---|---|---|---|---|---|---|
| 1 | 6.8 | 6.8:1 | 12.2 | 6.0 | 7.8 | 0.2 | 0.1 | 0.3 | 638 |
| 2 | 7.5 | 7.5:1 | 12.0 | 5.5 | 8.6 | 0.2 | 0.1 | 0.3 | 700 |
| 3 | 7.5 | 7.5:1 | 10.7 | 6.8 | 8.6 | 0.2 | 0.2 | 0.4 | 605 |
| 4 | 4 | 4:1 | 13.8 | 7.5 | 4.7 | 0.3 | 0.2 | 0.4 | 479 |
| 5 | 7.5 | 7.5:1 | 13.3 | 3.9 | 8.6 | 0.2 | 0.1 | 0.2 | 614 |
| 6 | 9.3 | 9.3:1 | 10.9 | 4.4 | 10.9 | 0.2 | 0.1 | 0.2 | 684 |
| 7 | 10.3 | 10.3:1 | 10.7 | 3.6 | 11.7 | 0.2 | 0.1 | 0.2 | 629 |
| 8 | 4.5 | 4.5:1 | 13.8 | 7.0 | 5.2 | 0.3 | 0.2 | 0.4 | 450 |
| 9 | 4 | 4:1 | 15.3 | 6.2 | 4.7 | 0.3 | 0.1 | 0.3 | 377 |
| 10 | 10.2 | 10.2:1 | 9.4 | 4.7 | 11.7 | 0.2 | 0.1 | 0.3 | 595 |
| 11 | 4.5 | 4.5:1 | 15.6 | 5.2 | 5.2 | 0.3 | 0.1 | 0.3 | 458 |
| 12 | 9.3 | 9.3:1 | 9.9 | 5.5 | 10.9 | 0.2 | 0.1 | 0.3 | 600 |
| 13 | 8.1 | 8.1:1 | 12.0 | 4.4 | 9.6 | 0.2 | 0.1 | 0.2 | 662 |
| 14 | 7.5 | 7.5:1 | 12.0 | 5.5 | 8.6 | 0.2 | 0.1 | 0.3 | 655 |

Example 9

One-Gram-Scale Preparation of Graphite Oxide from Graphite and Aqueous Sodium Chlorate Varying Initial Temperature and Amounts of Reagents The procedures of Example 8 are repeated with the variations shown in Table 8 below. In Table 8, the "Graphite Temperature (° C.) at Start of aq. NaClO₃ Addition" lists the temperature of the graphite-acids suspension when the aqueous ("aq.") sodium chlorate is started and added to the tubes slowly over 20 minutes while allowing temperature to exothermically increase. In Table 8, a ratio of moles of HNO₃ to moles of H₂SO₄ of 1 means 9.5 mL HNO₃ and 17.9 mL H₂SO₄ are used; a ratio of 0.5 means 4.8 mL HNO₃ and 8.9 mL H₂SO₄ are used.

TABLE 8

One-Gram-Scale Preparations of Graphite Oxide
from Graphite and Aqueous Sodium Chlorate Varying
Initial Temperature and Amounts of Reagents

| Example 9 Reaction Number | Graphite Temperature (° C.) at Start of aq. NaClO₃ Addition | Weight Ratio NaClO₃ to Graphite | Ratio of moles of HNO₃ to moles H₂SO₄ | Concentration of NaClO₃ in aq. NaClO₃ (Molar) | BET Surface Area (m²/g) |
|---|---|---|---|---|---|
| 1 | 5 | 2.39:1 | 0.5 | 2.5 | 46 |
| 2 | 5 | 2.39:1 | 0.5 | 5 | 103 |
| 3 | 5 | 2.39:1 | 1 | 2.5 | 173 |
| 4 | 5 | 2.39:1 | 1 | 5 | 133 |
| 5 | 5 | 4.78:1 | 0.5 | 2.5 | 14 |
| 6 | 5 | 4.78:1 | 0.5 | 5 | 655 |
| 7 | 5 | 4.78:1 | 1 | 2.5 | 647 |
| 8 | 5 | 4.78:1 | 1 | 5 | 654 |
| 9 | 5 | 7.17:1 | 0.5 | 2.5 | 18 |
| 10 | 5 | 7.17:1 | 0.5 | 5 | 476 |
| 11 | 5 | 7.17:1 | 1 | 2.5 | 455 |
| 12 | 5 | 7.17:1 | 1 | 5 | 688 |
| 13 | 20 | 2.39:1 | 0.5 | 2.5 | 120 |
| 14 | 20 | 2.39:1 | 0.5 | 5 | 248 |
| 15 | 20 | 2.39:1 | 1 | 2.5 | 274 |
| 16 | 20 | 2.39:1 | 1 | 5 | 146 |
| 17 | 20 | 4.78:1 | 0.5 | 2.5 | 53 |
| 18 | 20 | 4.78:1 | 0.5 | 5 | 707 |
| 19 | 20 | 4.78:1 | 1 | 2.5 | 674 |
| 20 | 20 | 4.78:1 | 1 | 5 | 680 |
| 21 | 20 | 7.17:1 | 0.5 | 2.5 | 48 |
| 22 | 20 | 7.17:1 | 0.5 | 5 | 739 |
| 23 | 20 | 7.17:1 | 1 | 2.5 | 574 |
| 24 | 20 | 7.17:1 | 1 | 5 | 812 |
| 25 | 35 | 2.39:1 | 0.5 | 2.5 | 44 |
| 26 | 35 | 2.39:1 | 0.5 | 5 | 107 |
| 27 | 35 | 2.39:1 | 1 | 2.5 | 183 |
| 28 | 35 | 2.39:1 | 1 | 5 | 132 |
| 29 | 35 | 4.78:1 | 0.5 | 2.5 | 120 |
| 30 | 35 | 4.78:1 | 0.5 | 5 | 608 |
| 31 | 35 | 4.78:1 | 1 | 2.5 | 610 |
| 32 | 35 | 4.78:1 | 1 | 5 | 703 |
| 33 | 35 | 7.17:1 | 0.5 | 2.5 | 80 |
| 34 | 35 | 7.17:1 | 0.5 | 5 | 595 |
| 35 | 35 | 7.17:1 | 1 | 2.5 | 577 |
| 36 | 35 | 7.17:1 | 1 | 5 | 713 |

Example 10

One-Gram-Scale Preparation of Graphite Oxide from Graphite and Solid Sodium Chlorate Varying Initial Temperature The procedures of Example 8 are repeated with the variations shown in Table 9 below. In Table 9, the "Graphite Temperature (° C.) at Start of solid NaClO₃ (or KClO₃) Addition" lists the temperature of the graphite-acids suspension when the solid sodium chlorate (or solid potassium chlorate) is started and added to the tubes slowly over 20 minutes while allowing temperature to exothermically increase. In Table 9, a ratio of moles of HNO₃ to moles of H₂SO₄ of 1 means 9.5 mL HNO₃ and 17.9 mL H₂SO₄ are used. Also in Table 9, an entry for solid potassium chlorate is shown for comparison.

TABLE 9

One-Gram-Scale Preparations of Graphite Oxide from Graphite
and Solid Sodium Chlorate Varying Initial Temperature

| Example 10 Reaction Number | Graphite Temperature (° C.) at Start of solid NaClO$_3$ (or KClO$_3$) Addition | Weight Ratio NaClO$_3$ (or KClO$_3$) to Graphite | Ratio of moles of HNO$_3$ to moles H$_2$SO$_4$ | BET Surface Area (m$^2$/g) |
|---|---|---|---|---|
| KClO$_3$ | (20) | (5.50:1) | 1 | 477 |
| 1 | 5 | 4.78:1 | 1 | 14 |
| 2 | 20 | 4.78:1 | 1 | 231 |
| 3 | 55 | 4.78:1 | 1 | 160 |
| 4* | 20 | 4.78:1 | 1 | 58 |

*5.2 mL of deionized water are added followed by addition of solid NaClO$_3$

Example 11

Ten-Gram-Scale Preparation of Graphite Oxide from Graphite and Aqueous Sodium Chlorate The reaction is performed in a 1000 mL glass kettle, covered by a loose-fitting, 3-hole Teflon lid and mixed with an overhead Teflon stirrer at 0° C. to 5° C. The addition of the oxidizer (aqueous NaClO$_3$) takes anywhere from 30 minutes to 2 hours and is conducted using a 50 mL burette. The reaction is allowed to continue from 1 hour to 120 hours, after which the lid is removed and the gases are vented. The contents are quenched with deionized water, the quenched mixture is filtered, and the filter cake is washed with deionized water.

Raw Materials:

Deionized water, 10 grams of −325 mesh graphite powder, concentrated Sulfuric acid (CAS #: 7664-93-9), concentrated Nitric Acid (CAS #: 7697-37-2), and 47.75 grams of Sodium Chlorate (CAS #: 7775-09-9) dissolved in 52 grams of deionized water.

General Reactor Set Up:

A 10 gram reactor is set up with a thermocouple well with two thermocouples disposed therein. An overhead glass stir rod is place through a center hole in Teflon lid, the thermocouple well (a glass tube) is placed in another hole in Teflon lid and a portion is below the reaction liquid surface, and two 3 millimeter (mm) diameter thermocouples inserted into the well, and third hole in Teflon lid is for the burette tip.

Place a large glass water/ice-bath container around the reactor and fix the reactor into place. Separately add concentrated sulfuric acid and concentrated nitric acid into the reactor with the overhead stirrer running at 150 revolutions per minute (rpm) to form a mixture having a 65:35 volume ratio. Wait for the mixed acids to cool to 0° C. to 5° C. before adding the graphite flake. Fine graphite powder (−325 mesh graphite; 10 grams) is added with stirring into acids mixture in the reactor to give a suspension of the graphite powder in the mixing acid. Dissolve sodium chlorate in deionized water to give a saturated solution thereof. When the initial temperature of the acid/graphite mixture reaches 0° C. to 5° C., begin to add the saturated aqueous sodium chlorate solution while controlling temperature by adjusting the addition rate of the aqueous sodium chlorate to keep the temperature below 5° C. Measure out 2.5 liters (L) of deionized water into a 4 L beaker. Stop the reaction overhead stirrer. Remove the lid of the reactor and pour the reaction contents into the 2.5 L of quench water. Rinse the reactor several times with additional deionized water into the beaker to give a greenish-brown suspension of shiny particles. Filter the suspension, and wash the filter cake with 1500 mL of deionized water. Dry the washed filter cake in a laboratory oven (60° C. to 80° C.) to a constant weight to give a black product (graphite oxide).

As shown by the Examples, aqueous sodium chlorate is a useful form of chlorate salt for preparing oxidized graphite according to a method of the present invention. Aqueous sodium chlorate facilitates finer control of addition rates of chlorate salts in the instant reactions, and hence finer control of nitronium ion-graphite complex concentrations in real time when monitoring using Raman spectroscopy.

While the present invention has been described above according to its preferred embodiments, it can be modified within the spirit and scope of this disclosure. This application is therefore intended to cover any variations, uses, or adaptations of the present invention using the general principles disclosed herein. Further, the application is intended to cover such departures from the present disclosure as come within the known or customary practice in the art to which this present invention pertains and which fall within the limits of the following claims.

What is claimed is:

1. A process for manufacturing oxidized graphite, the process comprising:
   (a) mixing concentrated sulfuric acid and concentrated nitric acid in a reaction vessel for a time sufficient to generate nitronium ions wherein the ratio of the sulfuric acid to the nitric acid is 1.6:1 to 3:1 (v/v), and wherein neither acid is a fuming acid;
   (b) combining the acids from step (a) and graphite to form a first mixture, wherein the acids from (a) are combined with the graphite so that a slight excess of nitronium ion is present;
   (c) stirring the first mixture for a time sufficient to form a graphite-nitronium intermediate;
   (d) adding aqueous solution comprising NaClO$_3$ at a concentration of at least 2.5 molar in a ratio of 1:4 to 1:7.17 (graphite:chlorate) to the first mixture at 0-35° C. and thereby forming a second mixture, wherein the chlorate is added so that when it reacts with the graphite-nitronium complex the rate of formation of ClO$_2$ is minimized;
   (f) stirring the second mixture; and
   (g) isolating the oxidized graphite from the reaction mixture.

2. A process according to claim 1, wherein the volume ratio of concentrated sulfuric acid to concentrated nitric acid in the reaction mixture is between 255:100 and 255:150.

3. A process according to claim 1, wherein the graphite consists essentially of particles having sizes characterized as being −10 mesh or a higher mesh number.

4. A process for manufacturing exfoliated graphene, the process comprising:
  providing oxidized graphite prepared according to the process of claim 1; and
  subjecting the oxidized graphite to an exfoliation step to produce exfoliated graphene.

5. A process according to claim 4, wherein the exfoliation step comprises heating the oxidized graphite at a temperature of from 250° C. 2000° C. under substantially inert atmosphere.

6. A process according to claim 5, wherein the exfoliation step comprises heating the oxidized graphite at a temperature of from 500° C. to 1500° C.

7. A process according to claim 1, wherein the exfoliated graphene is a highly exfoliated graphene having a Brunauer-Emmett-Teller surface area of from 400 meters-squared per gram to 1500 meters-squared per gram.

8. A process for manufacturing exfoliated graphene, the process comprising:
  providing oxidized graphite prepared according to the process of claim 1; and
  subjecting the oxidized graphite to an exfoliation step to produce exfoliated graphene.

9. A process according to claim 1, wherein the presence of nitronium ion or a nitronium-graphite complex is monitored in the reaction mixture during the reaction by Raman spectroscopy.

10. A process according to claim 1, wherein the first mixture is stirred for 2 to 4 hours.

11. A process according to claim 1, wherein the second mixture is stirred for between 4 hours and 50 hours.

* * * * *